US012108794B2

(12) United States Patent
Tucker et al.

(10) Patent No.: US 12,108,794 B2
(45) **Date of Patent: *Oct. 8, 2024**

(54) METHOD OF MAKING CARTRIDGE INCLUDING ABSORBENT MATERIAL WITH FIRST RESERVOIR AND SECOND RESERVOIR

(71) Applicant: Altria Client Services LLC, Richmond, VA (US)

(72) Inventors: Christopher S. Tucker, Midlothian, VA (US); Edmond Cadieux, Mechanicsville, VA (US); Barry S. Smith, Richmond, VA (US); William J. Crowe, Richmond, VA (US); Nam Tran, North Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,066

(22) Filed: Apr. 3, 2023

(65) Prior Publication Data

US 2023/0232900 A1 Jul. 27, 2023

Related U.S. Application Data

(62) Division of application No. 17/385,310, filed on Jul. 26, 2021, now Pat. No. 11,627,762, which is a (Continued)

(51) Int. Cl.
*A24F 47/00* (2020.01)
*A24F 40/42* (2020.01)
(Continued)

(52) U.S. Cl.
CPC ........... *A24F 40/42* (2020.01); *H05B 1/0244* (2013.01); *A24F 40/10* (2020.01); *A24F 40/485* (2020.01);
(Continued)

(58) Field of Classification Search
CPC ...................................................... A24F 47/00
(Continued)

(56) References Cited

U.S. PATENT DOCUMENTS

| | | |
|---|---|---|
| 8,528,569 B1 | 9/2013 | Newton |
| 8,689,805 B2 | 4/2014 | Hon |

(Continued)

FOREIGN PATENT DOCUMENTS

| | | |
|---|---|---|
| CN | 204466913 U | 7/2015 |
| DE | 202012004792 U1 | 6/2012 |

(Continued)

OTHER PUBLICATIONS

Jack Keenan, Volcano Tube Tank Review, Electronic Cigarette Reviews, edripping.com/e-cig-reviews/volcano-tube tank/, May 30, 2012.

(Continued)

*Primary Examiner* — Neil Abrams
(74) *Attorney, Agent, or Firm* — Harness, Dickey & Pierce, P.L.C.

(57) ABSTRACT

The method includes first defining a first reservoir and a second reservoir within a housing of a cartridge, the second reservoir being in fluid communication with the first reservoir, inserting at least one first layer of absorbent material within the first reservoir, and arranging a heater and a wick to be in communication with a central channel, the wick being in contact with the absorbent material.

20 Claims, 9 Drawing Sheets

Related U.S. Application Data division of application No. 16/529,220, filed on Aug. 1, 2019, now Pat. No. 11,071,329, which is a division of application No. 15/987,163, filed on May 23, 2018, now Pat. No. 10,390,567, which is a division of application No. 15/393,296, filed on Dec. 29, 2016, now Pat. No. 10,015,991.

(51) Int. Cl.

| | |
|---|---|
| ***H05B 1/02*** | (2006.01) |
| *A24F 40/10* | (2020.01) |
| *A24F 40/485* | (2020.01) |
| *A24F 40/50* | (2020.01) |
| *A24F 40/70* | (2020.01) |

(52) U.S. Cl.
CPC ............... *A24F 40/50* (2020.01); *A24F 40/70* (2020.01); *H05B 2203/021* (2013.01)

(58) Field of Classification Search
USPC .................................................. 131/328–329
See application file for complete search history.

(56) References Cited

U.S. PATENT DOCUMENTS

| | | | | |
|---|---|---|---|---|
| 8,997,753 | B2 | 4/2015 | Li et al. | |
| 9,113,659 | B2 | 8/2015 | Liu | |
| 9,220,302 | B2 | 12/2015 | DePiano et al. | |
| 9,301,547 | B2 | 4/2016 | Liu | |
| 9,480,286 | B2 | 11/2016 | Liu | |
| 9,497,994 | B2 | 11/2016 | Liu | |
| 9,510,623 | B2 | 12/2016 | Tucker et al. | |
| 9,980,514 | B2 | 5/2018 | Malamud et al. | |
| 10,015,991 | B1 | 7/2018 | Tucker et al. | |
| 10,021,910 | B2 | 7/2018 | Gavrielov et al. | |
| 10,390,567 | B2 | 8/2019 | Tucker et al. | |
| 11,627,762 | B2 * | 4/2023 | Tucker .................... | A24F 40/42 131/328 |
| 2013/0081642 | A1 | 4/2013 | Safari | |
| 2013/0192623 | A1 | 8/2013 | Tucker et al. | |
| 2013/0340779 | A1 | 12/2013 | Liu | |
| 2014/0109921 | A1 | 4/2014 | Chen | |
| 2014/0238422 | A1 | 8/2014 | Plunkett et al. | |
| 2014/0238424 | A1 | 8/2014 | Macko et al. | |
| 2014/0261408 | A1 | 9/2014 | DePiano et al. | |
| 2014/0261493 | A1 | 9/2014 | Smith et al. | |
| 2015/0020830 | A1 | 1/2015 | Koller | |
| 2015/0201674 | A1 | 7/2015 | Dooly et al. | |
| 2015/0208731 | A1 | 7/2015 | Malamud et al. | |
| 2015/0245654 | A1 | 9/2015 | Memari et al. | |
| 2015/0282529 | A1 | 10/2015 | Li et al. | |
| 2017/0016233 | A1 | 1/2017 | Sorkin | |
| 2017/0150753 | A1 | 6/2017 | Macko | |
| 2018/0027877 | A1 | 2/2018 | Tucker et al. | |
| 2018/0027879 | A1 | 2/2018 | Gavrielov et al. | |
| 2019/0124982 | A1 * | 5/2019 | Atkins .................... | A24F 40/30 |
| 2019/0289909 | A1 | 9/2019 | Hejazi | |

FOREIGN PATENT DOCUMENTS

| | | | |
|---|---|---|---|
| KZ | 31683 | B | 12/2016 |
| RU | 2597531 | C2 | 9/2016 |
| WO | WO-2014/150979 | A2 | 9/2014 |
| WO | WO-2014/187770 | A2 | 11/2014 |
| WO | WO-2015032093 | A1 | 3/2015 |
| WO | WO-2017/093356 | A1 | 6/2017 |
| WO | WO-2017/174595 | A1 | 10/2017 |
| WO | WO-2018/020037 | A1 | 2/2018 |

OTHER PUBLICATIONS

International Search Report and Written Opinion issued Apr. 17, 2018 for related PCT Application No. PCT/EP2017/084821.
International Preliminary Report on Patentability issued Dec. 14, 2018 in corresponding PCT Application PCT/EP2017/084821.
Russian Decision to Grant and Search Report dated Apr. 23, 2021, issued in corresponding Russian Patent Application No. 2019120836.
Notice of Allowance dated Feb. 23, 2021, issued in corresponding U.S. Appl. No. 16/529,220.
Notice of Allowance dated Dec. 20, 2022, issued in corresponding U.S. Appl. No. 17/385,310.

* cited by examiner

METHOD OF MAKING CARTRIDGE INCLUDING ABSORBENT MATERIAL WITH FIRST RESERVOIR AND SECOND RESERVOIR

PRIORITY CLAIM

This application is a divisional of U.S. application Ser. No. 17/385,310, filed Jul. 26, 2021, which is a divisional of U.S. application Ser. No. 16/529,220, filed Aug. 1, 2019, which is a divisional of U.S. application Ser. No. 15/987,163, filed May 23, 2018, which is a divisional of U.S. application Ser. No. 15/393,296, filed Dec. 29, 2016, the disclosures of each of which are incorporated by reference in their entirety.

BACKGROUND OF THE INVENTION

Field of the Invention

Example embodiments relate generally to a method of making a hybrid e-vaping cartridge, and a method of making an e-vaping device that includes the hybrid e-vaping cartridge.

Related Art

Electronic vaping (e-vaping) devices may be used to vaporize a pre-vapor formulation into a "vapor." E-vaping devices generally include a heater which vaporizes the pre-vapor formulation. The heater may be contained in a section of the e-vaping device, where this section may generally be in the form of an e-vaping tank or a cartridge that also contains a pre-vapor formulation reservoir. A power source, used to electrically energize the heater, may be contained in another section of the e-vaping device. The e-vaping device may also entail one singular section, or two or more sections.

An e-vaping cartridge generally includes a sealed pre-vapor formulation reservoir. A heater may communicate with a chimney that may be positioned within the cartridge. The heater may be in fluid communication with the reservoir via a wick (or other structure offering a capillary action), for instance. The reservoir is sealed, from the standpoint that the pre-vapor formulation within the cartridge is generally depleted during use until the reservoir is empty. And, once empty the cartridge may be disposed of, as the cartridge is unable to be re-filled with the pre-vapor formulation. Gauze, or other suitable fibrous material, may be included within the reservoir in order to help retain the pre-vapor formulation within the reservoir. However, gauze and/or a fibrous material is not included in and/or around the chimney.

An e-vaping tank generally includes a pre-vapor formulation reservoir that is unsealed, and may essentially be an empty vessel that allows for manual refilling. Similar to the cartridge, a heater may communicate with a chimney that may be positioned within the tank. The heater may be in fluid communication with the reservoir via a wick (or other structure offering a capillary action), for instance. Unlike a cartridge, the reservoir of the e-vaping tank may be unsealed. Therefore, once the pre-vapor formulation from the reservoir is depleted during use, at least a portion of the reservoir may be accessed in order to allow the reservoir to be manually filled again with the pre-vapor formulation, prior to additional use of the e-vaping tank. A gauze and/or a fibrous material is not located within the chimney, nor is gauze and/or a fibrous structure generally located within the reservoir.

SUMMARY OF THE INVENTION

At least one example embodiment relates to an e-vaping cartridge.

In one example embodiment, the e-vaping cartridge includes a housing body; a first tube extending longitudinally within the housing body, the first tube at least partially defining a central passage within the central tube, the first tube further defining at least one first hole that provides fluid communication between the central passage and a first annulus reservoir, the first annulus reservoir defined between the housing body and the first tube; one or more layers of absorbent material positioned within the inner annulus reservoir and around at least a portion of the first tube; a wick in communication with the central passage, distal ends of the wick traversing the at least one first hole of the first tube and being in communication with the first annulus reservoir; and a heater configured to vaporize a pre-vapor formulation that is communicated by the wick from the first annulus reservoir.

In one example embodiment, the e-vaping cartridge further includes a second tube extending longitudinally within the housing body and partially defining a second annulus reservoir between the housing body and the second tube, the second tube defining at least one second hole that provides fluid communication between the first annulus reservoir and the second annulus reservoir, the absorbent material being at least one of gauze and a fibrous material.

In one example embodiment, the e-vaping cartridge further includes a third tube connected to an end of the first tube, the third tube and the first tube collectively defining the central passage, the distal ends of the wick being in direct contact with a portion of the one or more layers of absorbent material.

In one example embodiment, the e-vaping cartridge further includes a first electrical lead electrically connected to a first end of the heater and a connector on a first end of the cartridge; a second electrical lead electrically connected to a second end of the heater and the third tube, the third tube being electrically conductive.

In one example embodiment, the e-vaping cartridge further includes a mouth-end insert on a second end of the cartridge, wherein ends of the first tube and the second tube contact the mouth-end insert.

In one example embodiment, a diameter of the second tube is between about 4 mm to 6 mm, the at least one second hole defined by the second tube having a total cross-sectional area between about 3.14 $mm^2$ and 9.42 $mm^2$.

In one example embodiment, the at least one second hole defined by the second tube includes four separate holes that each have a diameter of between about 1 mm and 4 mm.

In one example embodiment, the connector on the first end of the cartridge is a female threaded connector, a portion of the female threaded connector extending beyond the confines of the housing body and defining at least one air inlet in communication with the central passage of the cartridge.

In one example embodiment, an outer surface of a portion of the female threaded connector defines a groove, a first adhesive filling at least a portion of the groove to connect a distal end of the housing body to the base of the female threaded connector, a sealant at least partially covering a juncture between a distal end of the second tube and a proximal end of the female threaded connector.

In one example embodiment, at least a portion of the housing body is one of transparent and translucent.

At least another example embodiment relates to an e-vaping device.

In one example embodiment, the e-vaping device includes a cartridge, including, a first housing body, a first tube extending longitudinally within the housing body, the first tube at least partially defining a central passage within the central tube, the first tube further defining at least one first hole that provides fluid communication between the central passage and a first annulus reservoir, the first annulus reservoir defined between the housing body and the first tube, one or more layers of absorbent material positioned within the inner annulus reservoir and around at least a portion of the first tube, a wick in communication with the central passage, distal ends of the wick traversing the at least one first hole of the first tube and being in communication with the first annulus reservoir, and a heater configured to vaporize a pre-vapor formulation that is communicated by the wick from the first annulus reservoir; and a power section connectable to the cartridge, the power section including, a sensor configured to detect one or more internal vaping conditions within the power section and the cartridge if the power section is connected to the cartridge, a power source, and a control circuit configured to send an electrical current from the power source to the heater if the sensor detects the one or more vaping conditions.

In one example embodiment, the cartridge further includes, a second tube extending longitudinally within the housing body and partially defining a second annulus reservoir between the housing body and the second tube, the second tube defining at least one second hole that provides fluid communication between the first annulus reservoir and the second annulus reservoir, the absorbent material being at least one of gauze and a fibrous material.

In one example embodiment, the cartridge further includes, a third tube connected to an end of the first tube, the third tube and the first tube collectively defining the central passage, the distal ends of the wick being in direct contact with a portion of the one or more layers of absorbent material, wherein a diameter of the second tube of the cartridge is between about 4 mm to 6 mm, the at least one second hole defined by the second tube having a total cross-sectional area between about 3.14 $mm^2$ and 9.42 $mm^2$.

In one example embodiment, the cartridge further includes a first electrical lead electrically connected to a first end of the heater and a connector on a first end of the cartridge; a second electrical lead electrically connected to a second end of the heater and the third tube, the third tube being electrically conductive.

At least another example embodiment relates to a method of making an e-vaping cartridge.

In one example embodiment, the method includes cutting at least one first hole through a first tube and connecting a distal end of the first tube to a connector, the first tube at least partially defining a central passage within the first tube; inserting a wick and a heater through the at least one first hole of the first tube; wrapping one or more layers of absorbent material around at least a portion of the first tube; sliding a housing body over the first tube and connecting a proximal end of the housing body to the connector, the housing body partially defining a first annulus reservoir; filling the first annulus reservoir with a pre-vapor formulation; and connecting a mouth-end insert to a distal end of the housing body.

In one example embodiment, the connecting of the distal end of the first tube to the connector includes connecting a second tube to the connector and connecting the distal end of the first tube to the second tube.

In one example embodiment, the method further includes cutting at least one second hole in a third tube and sliding the first tube over at least a portion of the one or more layers of absorbent material and the first tube until a distal end of the third tube fits over a proximal end of the connector, distal ends of the wick being in communication with a second annulus reservoir at least partially defined by the third tube, the housing body and the third tube collectively and partially defining the first annulus reservoir, the absorbent material being at least one of gauze and a fibrous material, the distal ends of the wick directly contacting a portion of the one or more layers of absorbent material.

In one example embodiment, the method further includes connecting a first electrical lead to a first end of the heater and the connector, and connecting a second electrical lead to a second end of the heater and the second tube, prior to the one or more layers of absorbent material being wrapped around at least a portion of the first tube, the second tube being electrically conductive; and wherein a distal-most end of the first tube is positioned between the first and second electrical leads and an outer surface of the second tube.

In one example embodiment, the method further includes controlling a wicking rate of the wick by adjusting a total cross-sectional area of the at least one second hole in the third tube, a total cross-sectional area of the at least one second hole being between about 3.14 $mm^2$ and 9.42 $mm^2$.

In one example embodiment, the method further includes cutting a groove in an outer surface of the connector and at least partially filling the groove with an adhesive, the connecting of the proximal end of the housing body to the connector including adhering the proximal end of the housing body to the connector with the adhesive; and applying a sealant to a juncture between the distal end of the third tube and a portion of the proximal end of the connector.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
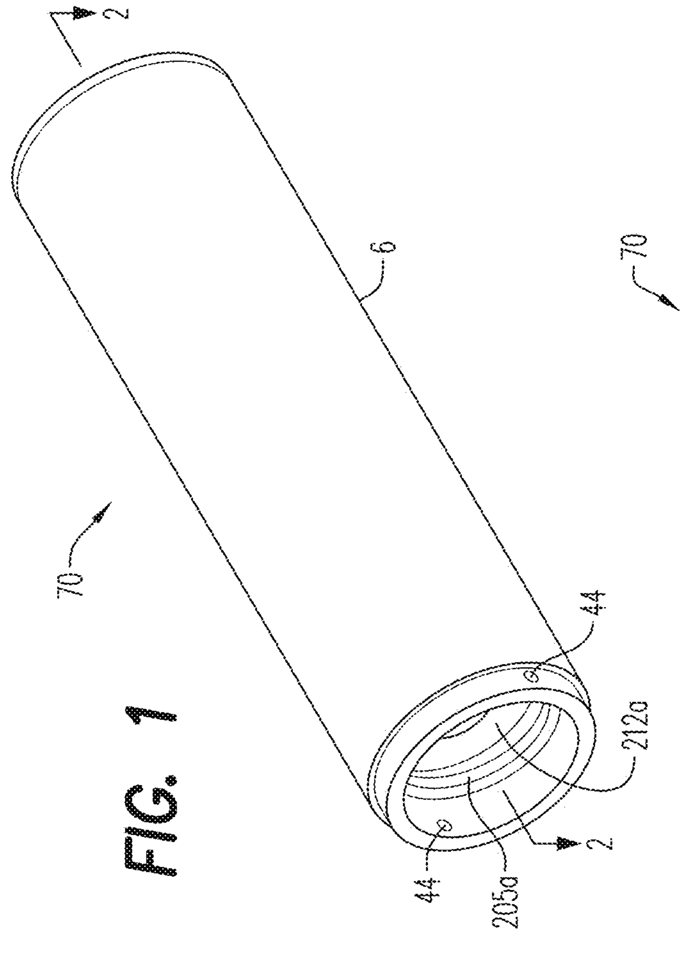
FIG. 1 illustrates a perspective view of a hybrid e-vaping cartridge, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 illustrates a perspective view of a hybrid e-vaping cartridge 70, in accordance with an example embodiment. As shown in FIG. 1, the cartridge may include an outer housing. An end of the cartridge 70 may have an electrical terminal **212*a* (such as an anode terminal 212*a*). The end of the cartridge 70 may also include threads 205*a* that may be capable of mating with one or more additional sections of an e-vaping device. For instance, the threads 205*a* may be on a male connector 205 (see FIG. 2), where the threads 205*a* may be configured to mate with threads 205*d* on a female connector 206 of another section, such as a power section 72 of an e-vaping device 71 (see FIG. 11). It should be understood that the threads 205*a* of the hybrid cartridge 70 may also be on a male connector (not shown) of the cartridge 70, such that the threads 205*a*** are capable of mating with a female connector of another section of an e-vaping device.

The end of the cartridge 70 may also include one or more air vents 44 that may positioned near distal ends of the connector 205, where the vent or vents 44 may be capable of communicating ambient air (outside of the cartridge 70) with internal air passages of the cartridge 70, as further described, herein.

Figure 2:
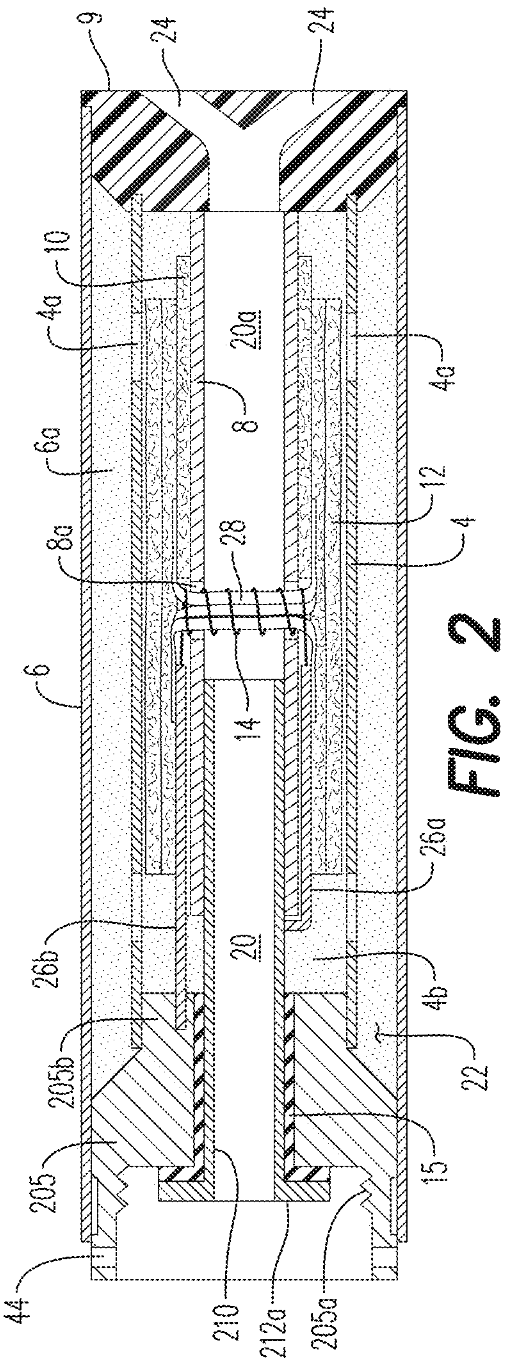
FIG. 2 illustrates a cross-sectional view of the hybrid e-vaping cartridge, in accordance with an example embodiment.

FIG. 2 illustrates a cross-sectional view (view '2' of FIG. 1) of the hybrid e-vaping cartridge 70, in accordance with an example embodiment. As shown in FIG. 2, the housing 6 may run along a majority of a longitudinal length of the cartridge 70. Though, a distal end of the connector 205 may extend beyond the confines of the housing 6, thereby allowing the air vent or vents 44 and an outer surface of the connector 205 to be visible and open to ambient air once a fully assembled e-vaping device 71 is fashioned with the cartridge 70.

The hybrid cartridge 70 may define a central air passage 20 in communication with another air path 20*a* that may allow a flow of air to persist within the cartridge 70 (where the central air passage 20 and air path 20*a* may collectively be considered a central passage 20/20*a*). Specifically, the central air passage 20 may be defined by an end tube 210 (that may be an electrically conductive tube, or an "energized tube") that may be held in place by the connector 205, where insulation 15 may be used to electrically isolate the energized tube 210 from the connector 205. A distal end of the energized tube 210 may form the electrical contact 212*a*, that may for instance be an anode contact 212*a*. A heater 14 with a wick 28 may be positioned to communicate with the tube 210, such as being positioned near an end of the tube 210. Electrical leads 26*a*/*b* may be electrically connected to ends of the heater 14. For instance, a cathode electrical lead 26*b* may be electrically connected to the connector 205 and an end of the heater 14, and an anode electrical lead 26*a* may be electrically connected to the energized tube 210 and another end of the heater 14.

An inner tube 4 may help define an inner annulus 4*b*, where the inner annulus 4*b* may be in communication with an outer annulus area 6*a*. An end of the inner tube 4 may, for instance, be affixed to a proximal end 205*b* of the connector 205 by being pressed over the proximal end 205*b* so that the inner tube 4 may compress the proximal end 205*b*. The other end of the inner tube 4 may be connected to a mouth-end insert 9 of the cartridge 70, where the insert 9 may include outlets 24, such as one or more diverging outlets 24. A central tube 8 may be compression-fitted over an end of the energized tube 210, where an end of the tube 8 may be pressed against the mouth-end insert 9 in order to cause the central tube 8 to define an air path 20*a* in communication with the central air passage 20.

One or more layers of absorbent gauze, high density gauze, sponge, or another suitable form of fibrous absorbent material, may be positioned within the inner tube 4 in order to also assist in defining the air path 20*a*. For instance, an inner layer of gauze 10 and an outer layer of gauze 12 may be positioned between the inner tube 4 and the central tube 8. It should be noted that more, or less, layers of gauze may be positioned within the inner tube 4. Just as an example, the inner layer of gauze 10 and the outer layer of gauze 12 may alternatively be one layer of gauze. By providing one or more layers of gauze inside the inner tube 4, where the annulus 6*a* is devoid of any gauze, the hybrid cartridge 70 combines the benefits from a tank-type of section (which may hold the pre-vapor formulation 22 in the outer annulus 6*a* for easy viewing of a pre-vapor formulation level, and may optionally be refillable) with the stability of a cartridge (where the gauze 10/12 may prevent leakage, and provide a consistent flow of the pre-vapor formulation 22 to the wick 28 and heater 14).

In an embodiment, each gauze layer 10/12 may be formed by a same material, or a different material. The gauze layers 10/12 may, for instance, be made from cotton, polyethylene, polyester, rayon, another polymer material, and/or another fibrous filament material, or combinations thereof that contain a dense number of interstitial spaces that may effectively absorb and retain the pre-vapor formulation 22 prior to the pre-vapor formulation 22 being drawn into the heater 14 via a capillary action of the wick 28. In an embodiment, each gauze layer 10/12 may be rectangular in shape, and may be about 18 mm wide and 22 mm long.

An annulus area 6*a* may be defined between the outer housing 6 and the inner tube 4. The annulus area 6*a* may be configured to contain a pre-vapor formulation 22. One or more holes 4*a* within the inner tube 4 may allow the pre-vapor formulation to be communicated between the annulus area 6*a* and an inner annulus area 4*b*, where the inner annulus area 4*b* may be defined in part by the inner tube 4, the central tube 8, the connector 205 and the mouth-end insert 9. Ends of the wick 28 may extend away from the heater 14 and through holes 8*a* within the central tube 8 (shown more clearly in FIGS. 3 and 4), in order to be in communication with the inner annulus area 4*b*. In particular, this wick 28 may be configured to draw a pre-vapor formulation from the inner annulus 4*b* towards the heater 14 so that the heater may vaporize the pre-vapor formulation when the cartridge 70 is in operation. In an embodiment, a length of the wick 28 may be between about 20 mm and 32 mm in total length.

It should be understood that, by providing the gauze layers 10/12 in the inner annulus space 4*b* of the cartridge, a wicking rate of the wick 28 may be better controlled in order to obtain a desired flow of pre-vapor formulation 22 to the heater 14. Furthermore, the gauze layers 10/12 may be oriented fibers that are capable of directing a flow of the pre-vapor formulation 22 (rather than simply retaining the pre-vapor formulation 22). In particular, if a wicking rate of the pre-vapor formulation 22 is too high, a vapor formation at the heater 14 may be too great. This over-production of vapor may act to saturate the air flow exiting the air path 20*a*, thereby causing the vapor that may be discharged from the cartridge 70 to have an undesired taste (and/or cause the exiting air path 20*a* to contain pre-vapor formulation 22 that is not properly vaporized). Meanwhile, if a wicking rate of the pre-vapor formulation is too low, a vapor formation at the heater 14 may be too low. This lower amount of vapor production may cause the vapor that may be discharged from the cartridge 70 to not include a sufficient amount of vapor, which is also undesirable.

A sizing of the holes 4*a* in the inner tube 4, and a total number of the holes 4*a* in the inner tube 4, may be adjusted to also adjust a wicking rate of the wick 28. That is to say, an overall cross-sectional area of the combined number of holes 4*a* may be adjusted to impact the wicking rate. In an example embodiment, a total cross-sectional area of the holes 4*a* may be between about 3.14 $mm^2$ and 9.42 $mm^2$, where this total cross-sectional area may be provided by including four separate holes 4*a* in the tube 4 that each have a diameter of between about 1 mm and 4 mm, for an inner tube diameter that is about 4 mm to 6 mm.

The heater 14 may be in the form of a wire coil, a planar body, a ceramic body, a single wire, a disk, a cage of resistive wire or any other suitable form. Furthermore, the heater 14 may also be in the form of a curled heater or a serpentine heater, as disclosed in these two patent applications that are hereby incorporated by reference in their entirety into this application: U.S. application Ser. No. 15/223,857, "Method of Making a Heater of an Electronic Vaping Device" by Christopher S. Tucker, et al., filed on Jul. 29, 2016; and U.S. application Ser. No. 15/224,866, "Cartridge and E-Vaping Device with Serpentine Heater" by Shmuel Gavrielov, et al., filed on Aug. 1, 2016. The wick 28 may run longitudinally through the coils of the heater 14, or the wick 28 may otherwise be in communication with the heater 14, in order to allow the heater 14 to vaporize pre-vapor formulation 22 that may be drawn toward the heater 14 by the wick 28. The wick 28 may be constructed of a fibrous and flexible material. The wick 28 may include at least one filament having a capacity to draw the pre-vapor formulation 22. For example, the wick 28 may comprise a bundle of filaments which may include glass (or ceramic) filaments. In an embodiment, a bundle comprising a group of windings of glass filaments, for example, three of such windings, may be arranged to form the wick 28 in order to draw the pre-vapor formulation 22 to the heater 14 via a capillary action of interstitial spacing within the filaments.

The pre-vapor formulation 22 may have a boiling point suitable for use in the cartridge 70. If the boiling point is too high, the heater 14 will not be able to vaporize the pre-vapor formulation 22 in the wick 28. However, if the boiling point is too low, the pre-vapor formulation 22 may vaporize without the heater 14 being activated.

The pre-vapor formulation 22 may include a tobacco-containing material including volatile tobacco flavor compounds which may be released from the pre-vapor formulation 22 upon heating. The pre-vapor formulation 22 may also be a tobacco flavor containing material or a nicotine-containing material. Alternatively, or in addition, the pre-vapor formulation 22 may include a non-tobacco material. For example, the pre-vapor formulation 22 may include water, solvents, active ingredients, ethanol, plant extracts and natural or artificial flavors. The pre-vapor formulation 22 may further include a vapor former. Examples of suitable vapor formers are glycerine, propylene glycol, etc.

Figure 3:
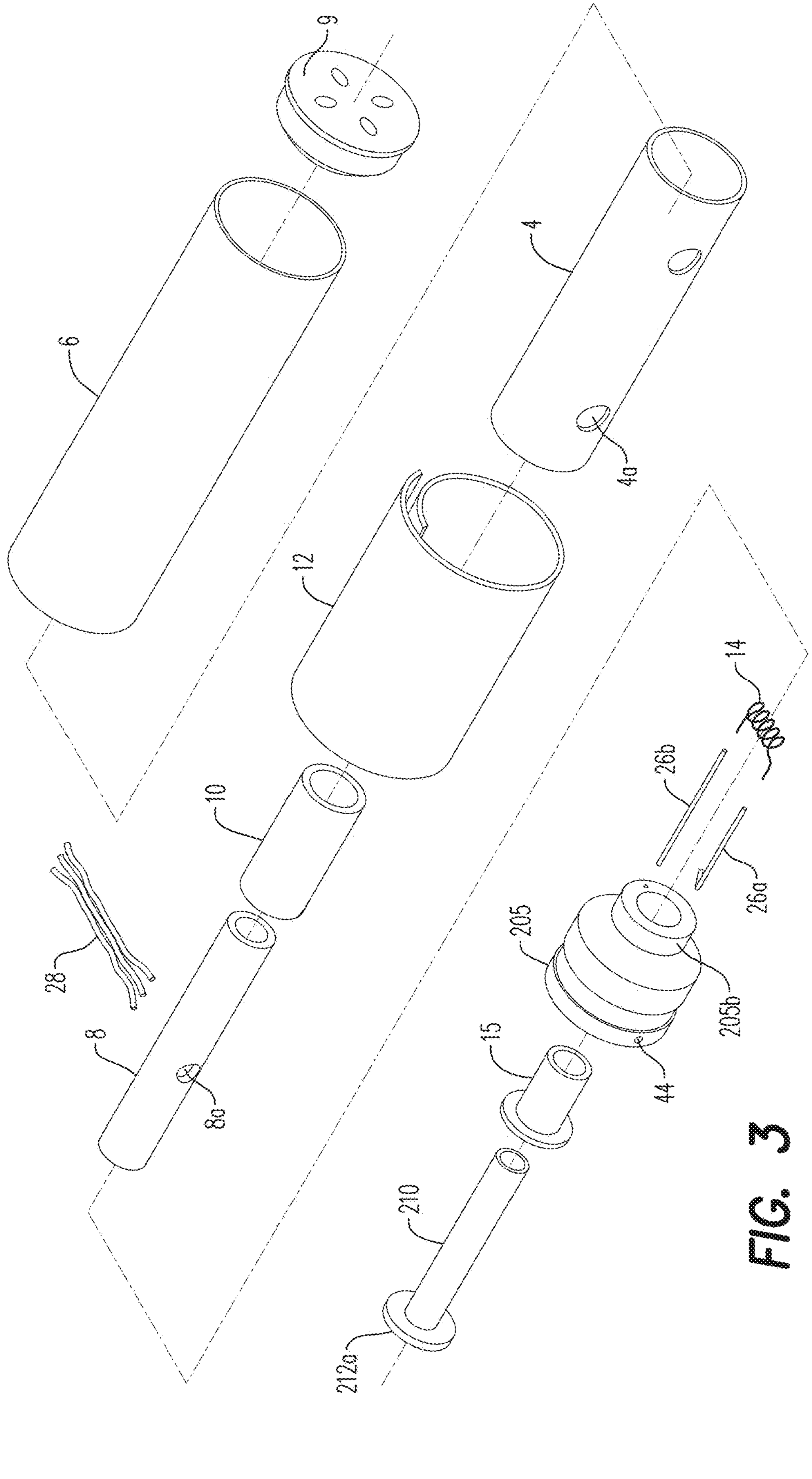
FIG. 3 illustrates an exploded view of the hybrid e-vaping cartridge, in accordance with an example embodiment.

FIG. 3 illustrates an exploded view of the hybrid e-vaping cartridge 70, in accordance with an example embodiment. Specifically, FIG. 3 depicts a basic assembly of elements of the cartridge 70. At a first end of the cartridge 70, an insulator sleeve 15 may fit over the energized tube 210, where the connector 205 may then fit over the insulator sleeve 15. One of the electrical leads 26*a/b* (such as cathode electrical lead 26*b*) may be inserted into a proximal end 205*b* of the connector 205, while another of the electrical leads 26*a/b* (such as anode electrical lead 26*b*) may be connected to the energized tube 210. Both of the electrical leads may be connected to respective ends of the heater.

The central tube 8 may define a hole 8*a* passing through the tube 8, where the hole 8*a* may accept the wick 28 and heater 14. This tube 8 may be made from fiberglass, hydrophilic polyethylene oxide, or an organic thermoplastic polymer, for example, in order to provide a more robust structure, as this tube 8 may, in essence, form a "chimney" structure that acts as a barrier between the inner annulus 4*b* and the air path 20*a*. An inner layer of gauze 10, and optionally an outer layer of gauze 12 (or, even further layers of gauze and/or fibers) may be inserted into the inner tube 4. The inner tube 4 may be slid over the energized tube 210, once a proximal end of the tube 210 is inserted through the connector 205.

The outer housing 6 may fit over the inner tube 4, followed by the mouth-end insert 9 being fitted to a proximal end of the housing 6.

Figure 4:
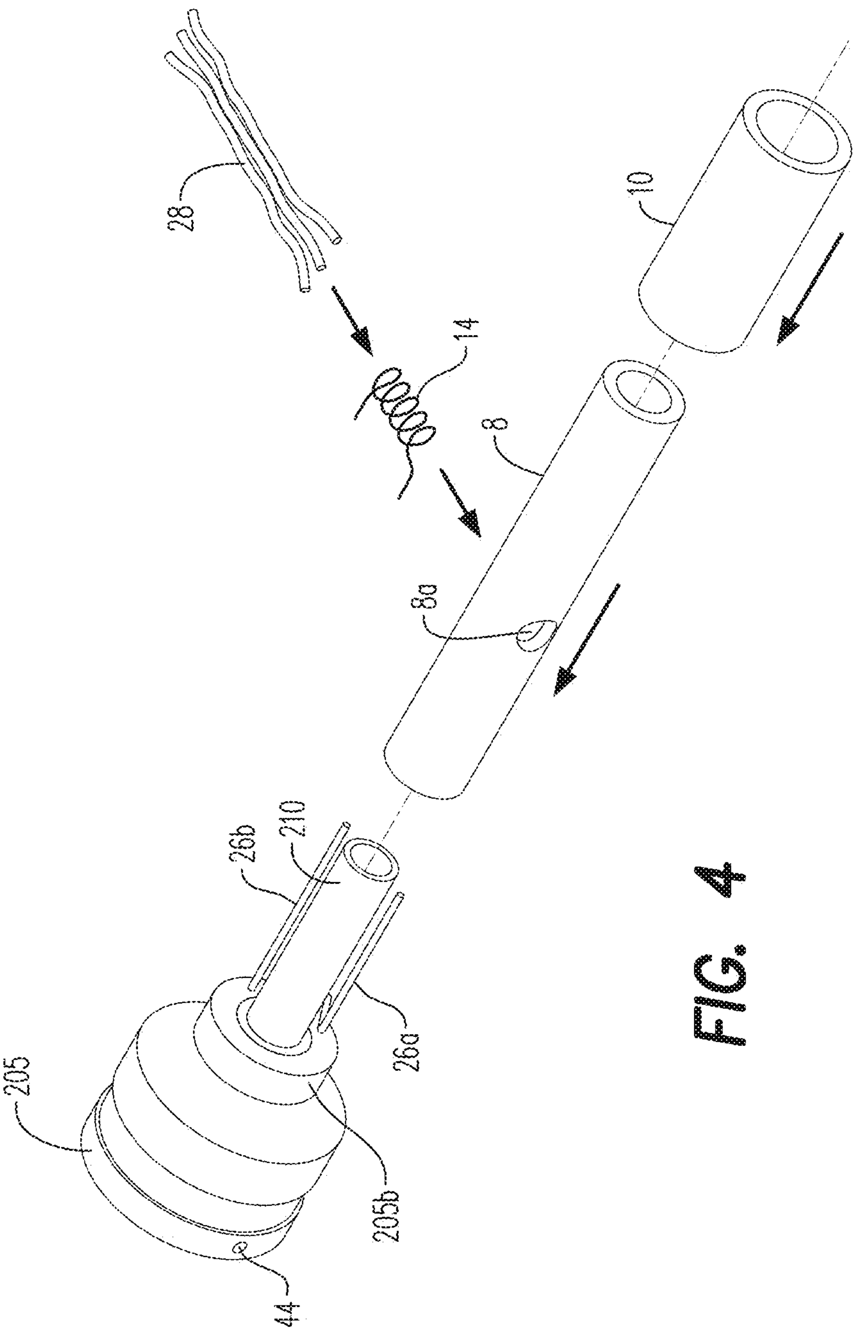
FIG. 4 illustrates a step of assembling the hybrid e-vaping cartridge, in accordance with an example embodiment.
Figure 6:
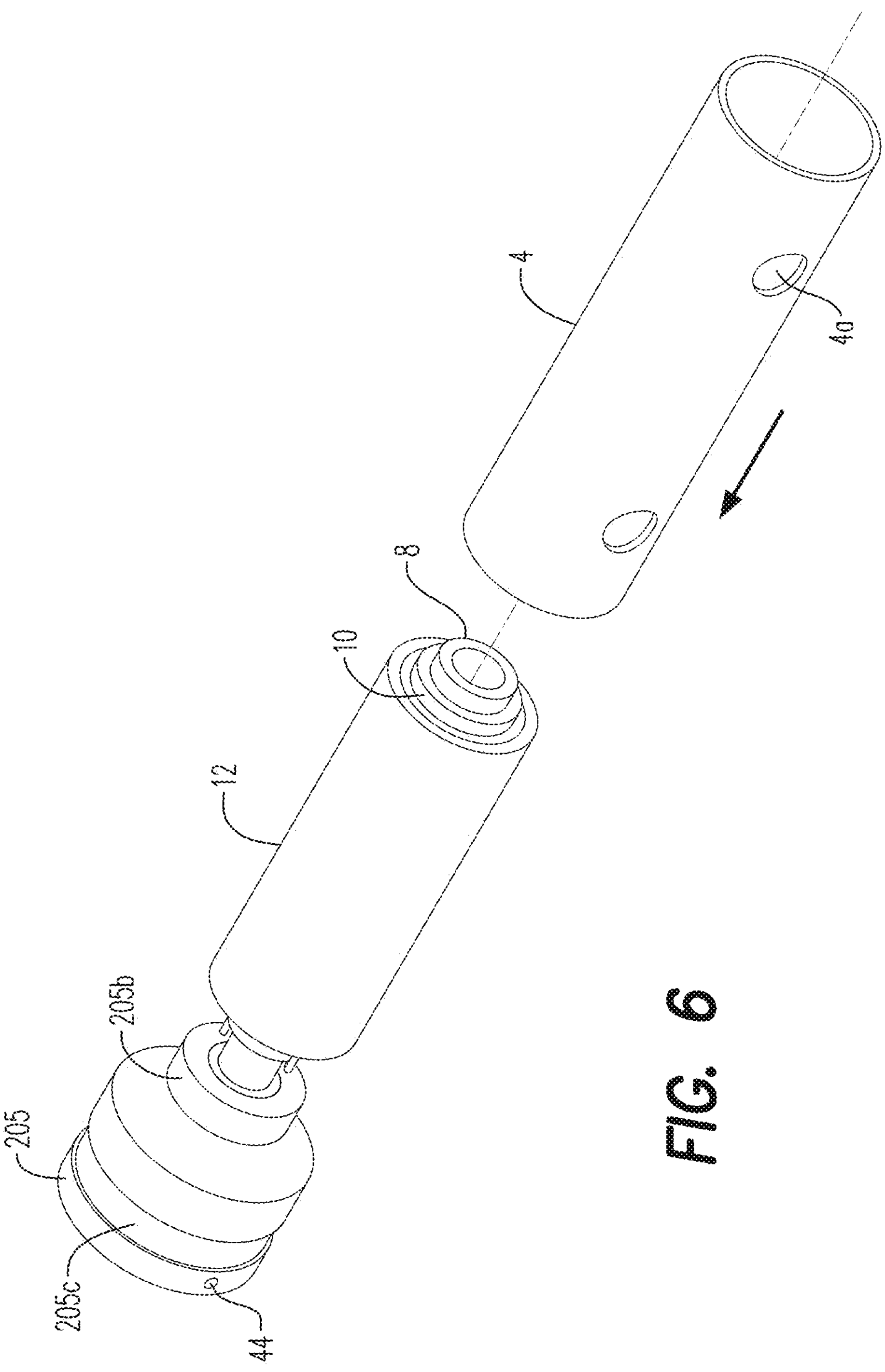
FIG. 6 illustrates another step of assembling the hybrid e-vaping cartridge, in accordance with an example embodiment.

FIG. 4 illustrates a step of assembling the hybrid e-vaping cartridge 70, in accordance with an example embodiment. Notice that, in this depicted step, the energized tube 210 has been fully inserted through the connector 205, where the anode electrical lead 26*a* may be connected to a side of the tube 210, and the cathode electrical lead 26*b* may be connected to the proximal end 205*b* of the connector 205. It should be noted that placement of these electrical leads 26*a/b*, which run lengthwise near an outer surface of the energized tube 210, allows for the electrical leads 26*a/b* to be contained within the inner tube 4 (see FIG. 6 showing the inner tube 4 being fitted over the gauze 10/12 and electrical leads 26*a/b*).

The heater 14 may be inserted into the hole 8*a* defined by the central tube 8, where the wick 28 may be fitted through the coils of the heater 14. The tube 8, and an inner layer of gauze 10, may be slid over the energized tube 210.

Figure 5:
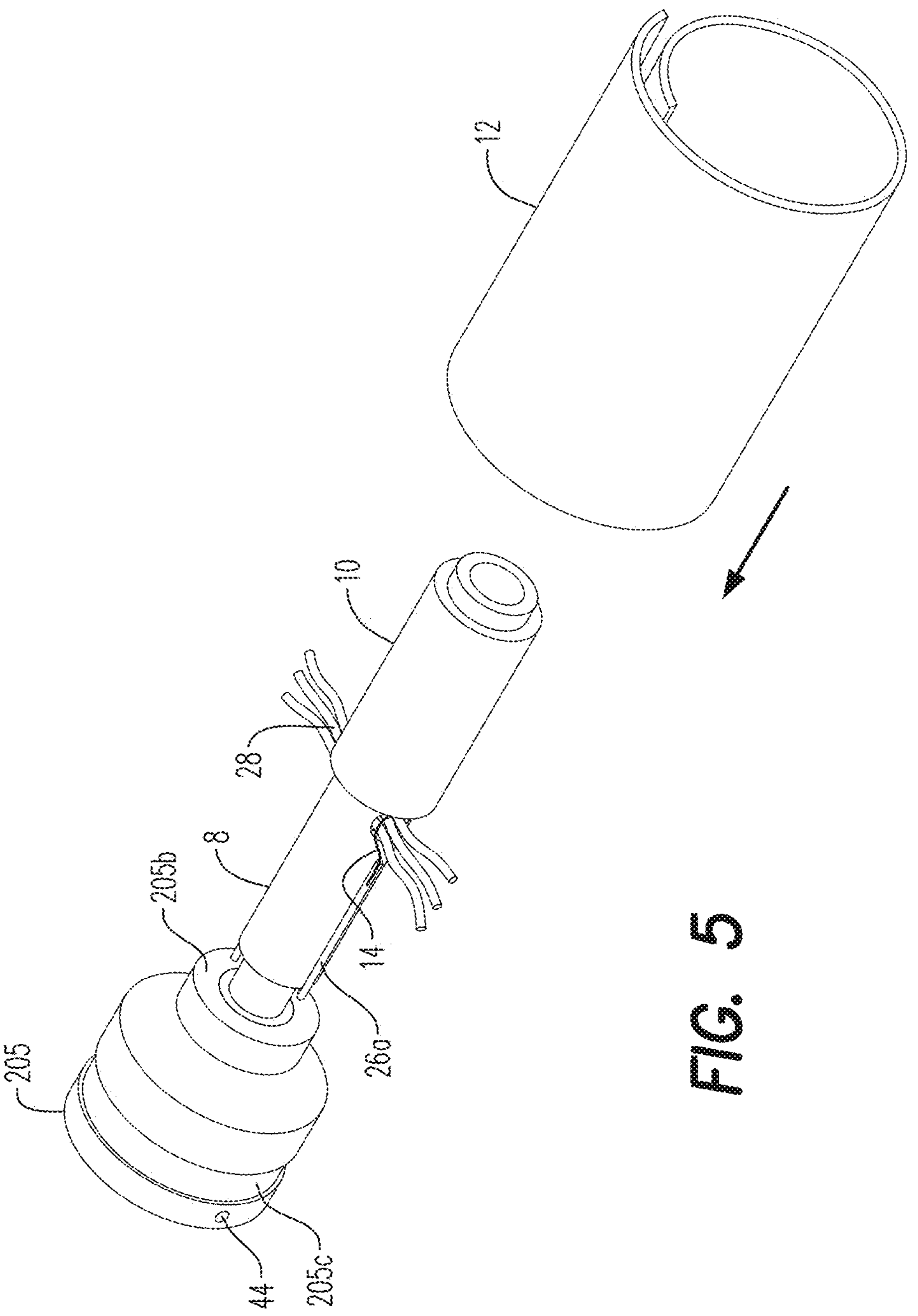
FIG. 5 illustrates another step of assembling the hybrid e-vaping cartridge, in accordance with an example embodiment.

FIG. 5 illustrates another step of assembling the hybrid e-vaping cartridge 70, in accordance with an example embodiment. In this step, distal end of the wick 28 may emanate from the hole 8*a* of the central tube 8. The inner layer of gauze 10 may then slide over a proximal end of the tube 8, such that a distal end of the intermediate gauze may be positioned near (but not overlapping) the position of the wick 28. The outer gauze 12 may then be fitted over both the inner gauze 10 and the tube 8, such that the outer gauze 12 may envelope, or at least partially envelope, the inner gauze layer 10.

It is noted that an annular groove 205*c* may exist near a distal end of the connector. This groove 205*c* may be used to secure the housing to the connector 205, as explained in more detail in FIG. 7 (below).

FIG. 6 illustrates another step of assembling the hybrid e-vaping cartridge 70, in accordance with an example embodiment. In this step, the inner tube 4 may be fitted over each of the layers of gauze 10/12, where any number of gauze layers may be utilized. It is noted that an effective diameter of the wound gauze layers 10/12, and a diameter of the inner tube 4, may be coordinated in order to ensure that the inner tube 4 provides the gauze 10/12 with a tight fit in order to mitigate unwinding/unraveling of the gauze layers 10/12 over time.

Figure 7:
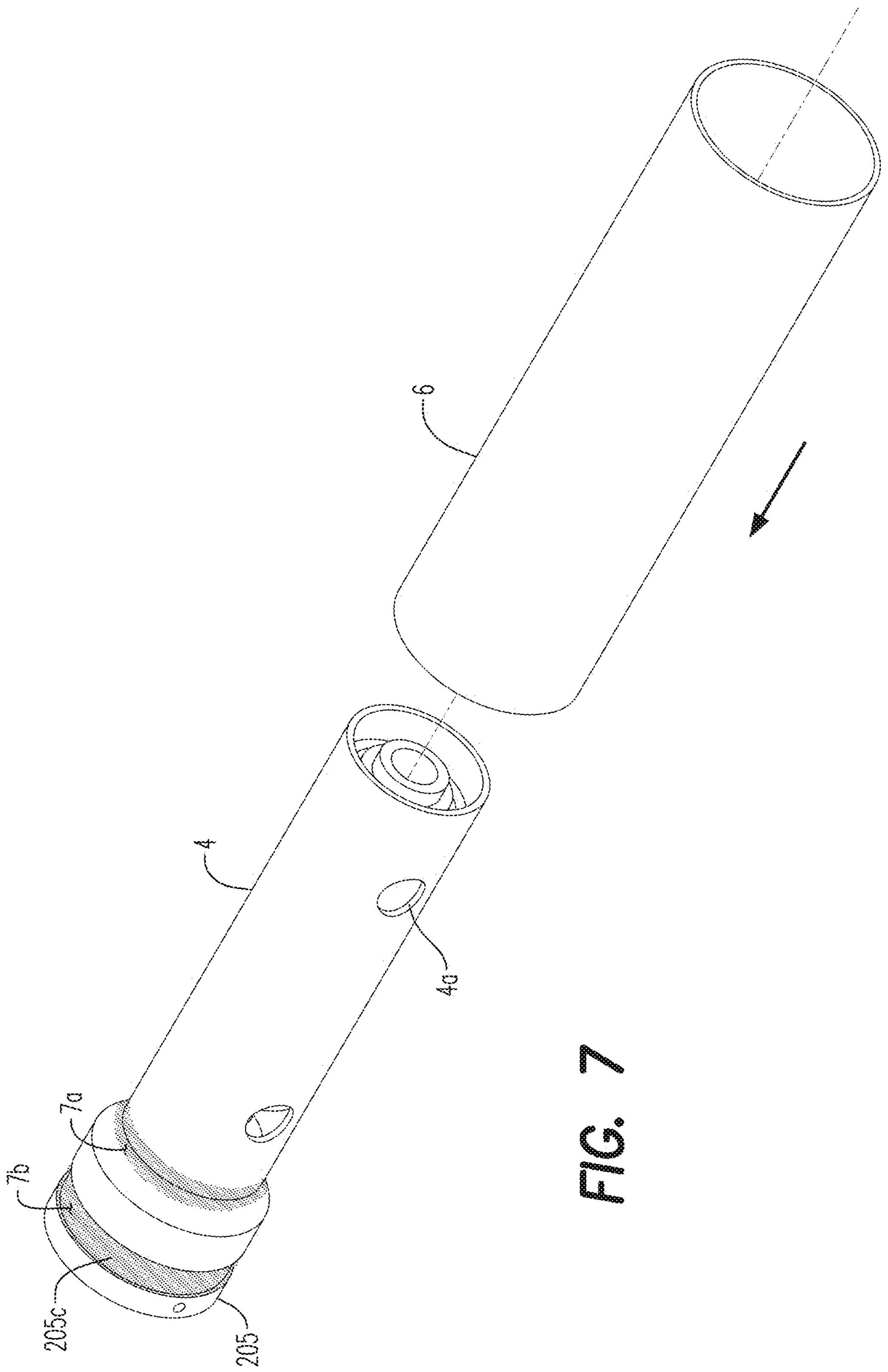
FIG. 7 illustrates another step of assembling the hybrid e-vaping cartridge, in accordance with an example embodiment.

FIG. 7 illustrates another step of assembling the hybrid e-vaping cartridge 70, in accordance with an example embodiment. In this step, an adhesive layer (sealant) 7*a* may be applied to the juncture where the inner tube 4 contacts the connector 205. This sealant 7*a* may be a silicon-based adhesive, or another suitable sealant. The sealant 7*a* may be added to the juncture between the inner tube 4 and the connector 205 after a distal end of the inner tube 4 is pressed over a proximal end 205*b* of the connector 205. The sealant 7*a* may provide a liquid impenetrable seal between the juncture between the distal end of the inner tube 4 and the connector 205, in an environment where the sealant 7*a* may be submerged in the pre-vapor formulation 22. The sealant 7*a* may also help securely affix the distal end of the inner tube 4 to the connector 205.

Another adhesive (sealant) 7*b* may be applied to the groove 205, prior to the housing 6 being seated on the connector 205. This adhesive 7*b* may also be a silicon-based adhesive, or another suitable sealant, that may securely affix a distal end of the housing 6 to the connector 205, where the adhesive 7*b* may form a liquid-impenetrable seal to mitigate the pre-vapor formulation from escaping the housing 6 at this juncture with the connector 205.

Figure 8:
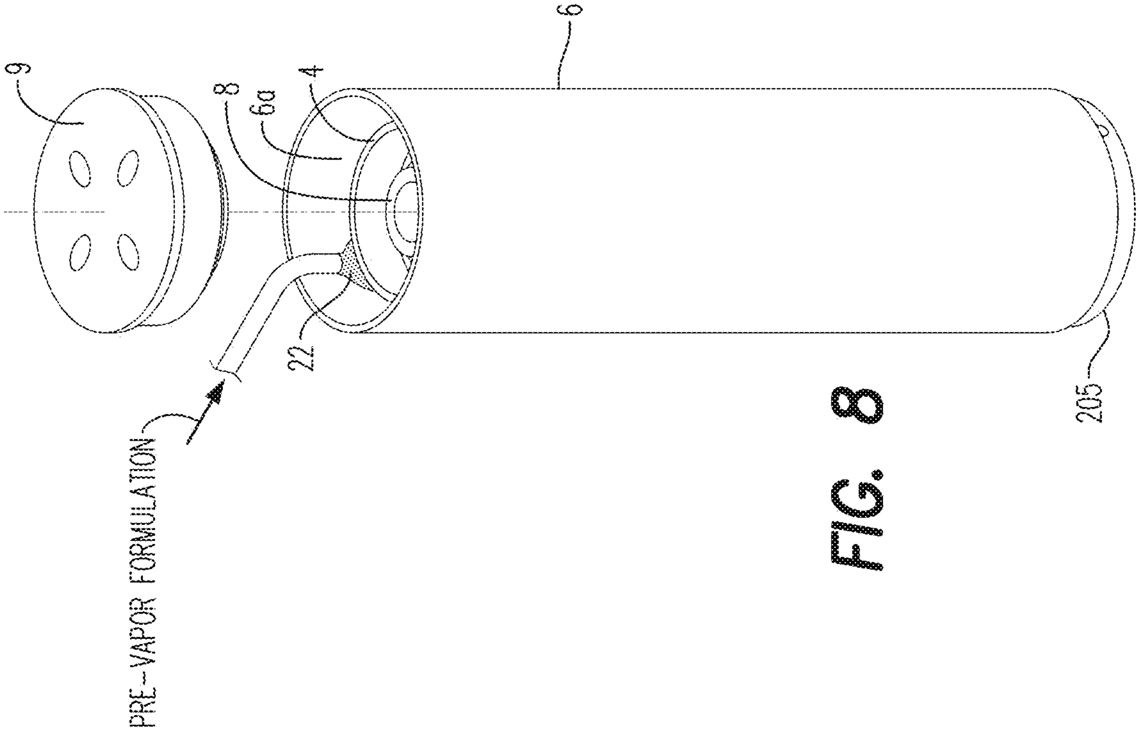
FIG. 8 illustrates another step of assembling the hybrid e-vaping cartridge, in accordance with an example embodiment.

FIG. 8 illustrates another step of assembling the hybrid e-vaping cartridge 70, in accordance with an example embodiment. In this step, the pre-vapor formulation 22 may be added to the annular space 6*a* between the housing 6 and the inner tube 4. It should be understood that, following an addition of the pre-vapor formulation within the annulus space 6*a*, the pre-vapor formulation 22 may then flow through holes 4*a* in the inner tube 4, thereby allowing the pre-vapor formulation to flow into the inner annulus space 4*b*. In the annulus space 4*b*, the pre-vapor formulation 22 may become absorbed and permeate through the layers of gauze 10/12.

Figure 9:
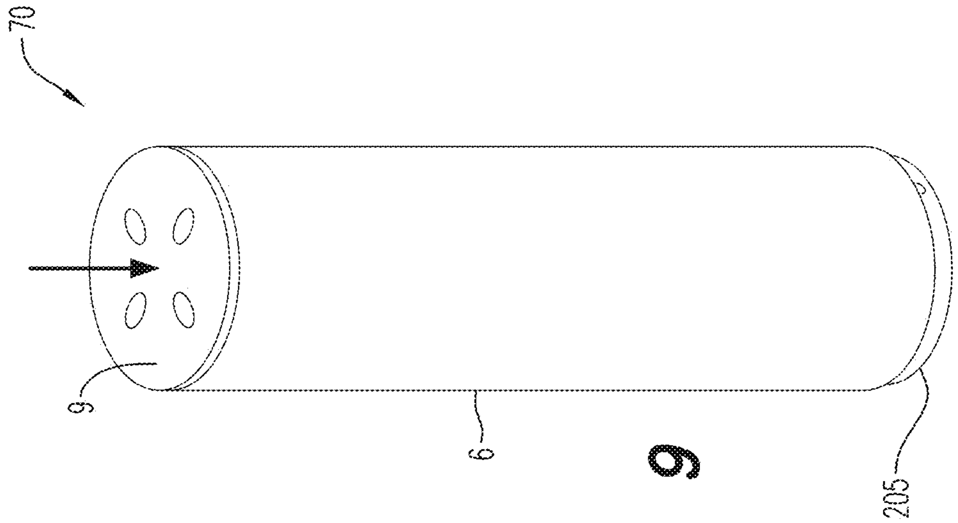
FIG. 9 illustrates another step of assembling the hybrid e-vaping cartridge, in accordance with an example embodiment.

FIG. 9 illustrates another step of assembling the hybrid e-vaping cartridge 70, in accordance with an example embodiment. In this step, the mouth-end insert 9 may be affixed to a proximal end of the cartridge 70. The insert 9 may be affixed via the use of an adhesive, mating threads, a friction fitting, a snap fit, ultrasonic welding, etc. This joining of the insert 9 with the housing 6 may create a liquid-impenetrable seal in order to ensure that the pre-vapor formulation may not escape the confines of the cartridge 70.

The mouth-end insert 9 may optionally be configured to be removed for a recharging of the pre-vapor formulation 22 within the cartridge. This may allow the cartridge 70 to optionally be reusable, rather than disposable.

Figure 10:
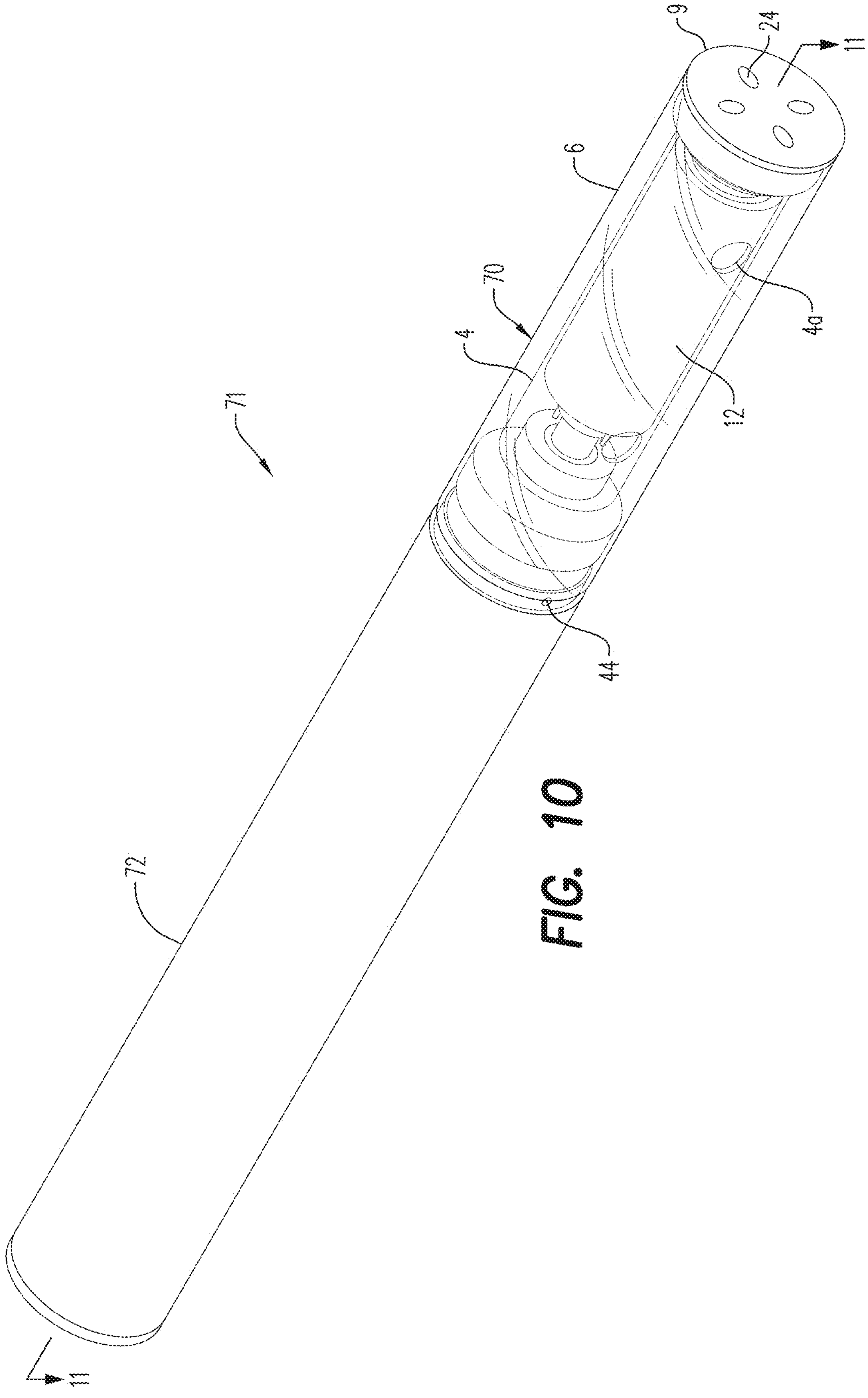
FIG. 10 illustrates an e-vaping device with a hybrid e-vaping cartridge, in accordance with an example embodiment.

FIG. 10 illustrates an e-vaping device 71 with a hybrid e-vaping cartridge 70, in accordance with an example embodiment. In this embodiment, another section 72 may be connected to the cartridge 70. The other section 72 may be a power section of the device 71, as shown in better detail in FIG. 11 (described below).

In this embodiment, it is noted that either the housing 6, or both the housing 6 and the inner tube 4, may be made from a transparent or translucent material. The transparent and/or translucent material may be made from glass, acrylic, polycarbonate, quartz, silica, or other suitable materials that allows for the internals of the cartridge 70 to be viewed. In particular, the transparent and/or translucent nature of the housing 6 (or the housing 6 and inner tube 4) may allow a remaining level of the pre-vapor formulation to be determined.

It should be noted that, with the existence of the gauze layers 10/12, and especially with regard to a relatively thick layer of gauze 10/12, the cartridge 70 may appear to be devoid of visible amounts of the pre-vapor formulation 22 toward an end of a useful life of the cartridge 70. However, given the absorptive qualities of the gauze 10/12, the cartridge 70 may continue to successfully operate for a fairly extended period of time despite a lack of any visible presence of the pre-vapor formulation 22.

Figure 11:
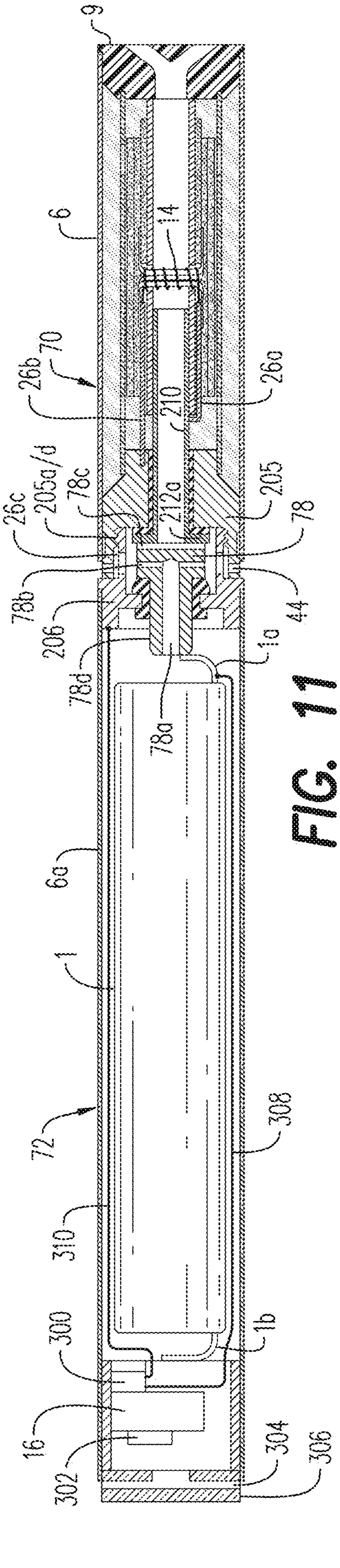
FIG. 11 illustrates a cross-sectional view of an e-vaping device with a hybrid e-vaping cartridge, in accordance with an example embodiment.

FIG. 11 illustrates a cross-sectional view (view '11' of FIG. 10) of an e-vaping device 71 with a hybrid e-vaping cartridge 70, in accordance with an example embodiment. The cartridge 70 may be connected to the other section 72, which may be a power section 72, via mating threads 205*a/d*. Specifically, the power section 72 may include an outer housing 6*a*, and a male connector 206 that may have threads 205*d* on the connector 206. The connector 206 may be configured to mate with a female connector 205 that also includes threads 205*a*. Other means of connecting the sections 70/72 may also be used, such as a friction fitting, a snap fitting, adhesive, a removable and/or insertable pin, or other suitable means of joining the sections 70/72. Furthermore, the power section 72 may be permanently connected to the cartridge 70, such that the power section 72 may be an integral section of the cartridge 70.

The power section 72 may include a power source 1, such as a battery. The battery may be a Lithium-ion battery or one of its variants, for example a Lithium-ion polymer battery. Alternatively, the battery may be a Nickel-metal hydride battery, a Nickel cadmium battery, a Lithium-manganese battery, a Lithium-cobalt battery or a fuel cell. In that case, power section 72 may be usable until the energy in the power supply 1 is depleted. Alternatively, the power supply 1 may be rechargeable and include circuitry allowing the battery to be chargeable by an external charging device. In that case, the circuitry, when charged, may provide power for a desired (or alternatively, a determined) number of puffs, after which the circuitry must be re-connected to an external charging device.

The power source 1 may have electrical connections 1*a/b* emanating from the power source 1. For instance, the power source 1 may have an anode connection 1*a* and a cathode connection 1*b* that may help create an electrical circuit to power the operations of the device 71. For instance, the power source 1 may be electrically connected to a sensor 16 and a control circuit 300 that may control an operation of the device 71. The control circuit 300 may be disposed on a rigid printed circuit board 302. The circuit board 302 may be connected to the first electrical connection 1*a* of the power supply 1 via electrical lead 308, and the circuit board 302 may be connected to the second electrical connection 1*b* via electrical lead 310. The power source 1 may also send an electrical current to the heater 14 of the cartridge 70 (as explained below in more detail).

Upon joining the sections 70/72 of the e-vaping device 71, air flow paths may exist in order to communicate an air flow between the sections 70/72. Specifically, an anode electrical post 78 and a post stem 78*a* may define an air passage 78*a* running through the post 78. One or more side vents 78*b* may emanate from the air passage 78*a*. The side vents 78*b* may be in fluid communication with both the air vents 44 and one or more channels 78*c* that may exist between the anode post 78 and the anode terminal 212*a* of the cartridge 70. The one or more channels 78*c* may be in fluid communication with the central air passage 20.

In an assembled state, the e-vaping device 71 may form an electrical circuit that powers the operations of the device 71. The circuit may include the power source 1, the sensor 16, the control circuit 300, electrical leads 308/310, connector 206 (that may be made from an electrically conductive metal), an electrical lead 26*c* in electrical contact with both the connector 206 of the power section 72 and the connector 205 of the cartridge 70, and the heater 14 that is in electrical contact with the connector 205 (via electrical lead 26*b*) and the electrical post 78 of the power section 72 (via electrical lead 26*a* and the energized tube 210).

The E-Vaping Device in Operation:

Based on an understanding of the e-vaping device 71 (above), an operation of the assembled device 71 with the hybrid cartridge 70 is explained herein. Airflow through the device 71 may be caused by air being drawn into the cartridge 70 primarily from the air inlets 44, where the air may flow through the one or more channels 78*c*, into the central air passage 20, and the air passage 20*a* where the airflow may become entrained by vapor that may be produced by the heater 14 heating the pre-vapor formulation 22 absorbed via the wick 28, prior to the airflow and entrained vapor being discharged from the device 71 at the mouth-end insert 9. Because the channels 78*c* may be in fluid communication with the side vents 78*b* and air passage 78*a* running through post 78, the sensor 16 may then be capable of detecting vaping conditions (discussed below), so that the control circuit 300 may provide an electrical current from the power supply 1 to the heater 14. In an embodiment, when activated, the heater 14 may heat a portion of the wick 28 for less than about 10 seconds.

The airflow through the device 71 may be used to activate the device 71. Specifically, the sensor 16 may be configured to generate an output indicative of a magnitude and direction of the airflow, where the control circuit 300 may receive the sensor 16 output and determine if the following vaping conditions exist: (1) a direction of the airflow indicates a draw on the mouth-end insert 9 (versus blowing air through the insert 9), and (2) a magnitude of the airflow exceeds a threshold value. If these internal vaping conditions of the device 71 are met, the control circuit 300 may electrically connect the power supply 1 to the heater 14, thereby activating the heater 14. Namely, the control circuit 300 may electrically connect the electrical lead 310 and electrical connection 1*b* (by activating a heater power control transistor forming part of the control circuit 300) so that the heater 14 may become electrically connected to the power supply 1. In an alternate embodiment, the sensor 16 may generate an output indicative of a pressure drop whereupon the control circuit 300 may activate the heater 14, in response thereto.

In an embodiment, the control circuit 300 may include a light 304, which the control circuit 300 may activate to glow when the heater 14 is activated and/or the power supply 1 is recharging. The light 304 may include one or more light-emitting diodes (LEDs). The LEDs may include one or more colors (e.g., white, yellow, red, green, blue, etc.). Moreover, the light 304 may be arranged to be visible to an adult vaper during vaping, where the light 304 may be positioned near the endcap 306 of the power section 72 of the e-vaping device 71. The light 304 may also be utilized for e-vaping system diagnostics. The light 304 may be configured such that an adult vaper may activate and/or deactivate the heater activation light 304 for privacy.

In an embodiment, the control circuit 300 may include a time-period limiter. In another embodiment, the control circuit 300 may include a manually operable switch for an adult vaper to initiate heating. The time-period of the electric current supply to the heater 14 may be set or pre-set depending on an amount of pre-vapor formulation 22 desired to be vaporized.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method, comprising:

first defining a first reservoir and a second reservoir within a housing of a cartridge, the second reservoir being in fluid communication with the first reservoir;

inserting at least one first layer of absorbent material within the first reservoir; and arranging a heater and a wick to be in communication with a central channel, the wick being in contact with the absorbent material.

2. The method of claim 1, further comprising:

configuring an interior of the second reservoir to be devoid of an absorbent material.

3. The method of claim 1, further comprising:

second defining at least one first hole within a first wall that is between the first reservoir and the second reservoir.

4. The method of claim 3, further comprising:

filling the second reservoir with a pre-vapor formulation, wherein the second defining defines the at least one first hole such that the pre-vapor formulation flows from the second reservoir into the first reservoir through the at least one first hole during the filling.

5. The method of claim 3, further comprising:

controlling a wicking rate of the cartridge by adjusting an overall cross-sectional flow area of at least one first hole that is defined within a first wall between the first reservoir and the second reservoir.

6. The method of claim 3, further comprising:

controlling a vapor production of the cartridge by adjusting an overall cross-sectional flow area of at least one first hole that is defined within a first wall between the first reservoir and the second reservoir.

7. The method of claim 1, further comprising:

second defining at least one first hole within a first wall that is between the first reservoir and the second reservoir, the first wall at least partially defining the first reservoir and the second reservoir.

8. The method of claim 7, wherein the arranging arranges the wick to extend through at least one second hole that is defined within a second wall, the second wall being between and at least partially defining the first reservoir and the central channel.

9. The method of claim 1, wherein the inserting inserts the at least one first layer of absorbent material as a plurality of layers of the absorbent material, the absorbent material being at least one of gauze or a fibrous material.

10. The method of claim 9, wherein the arranging arranges the wick as a filamentary wick, the filamentary wick being made from a different material relative to the absorbent material.

11. The method of claim 1, wherein the inserting inserts the at least one first layer of absorbent material as a plurality of layers of the absorbent material, one or more of the plurality of layers being made from a different material relative to a remaining number of the plurality of layers.

12. The method of claim 1, further comprising:

second defining an airflow path through the housing, the central channel forming at least a portion of the airflow path.

13. The method of claim 12, further comprising:

first configuring a control circuit to send an electrical current from a power supply to the heater in response to a sensor detecting one or more internal vaping conditions within the airflow path during an active use of the cartridge, the sensor being operationally connected to the control circuit.

14. The method of claim 13, wherein the arranging:

arranges the wick to transport a pre-vapor formulation from the first reservoir to the heater, and arranges the heater to at least partially vaporize the pre-vapor formulation to produce a vapor that is entrained within the airflow path, during the active use of the cartridge.

15. The method of claim 13, further comprising:

second configuring electrical elements of a power section to be operationally connected to the heater in response to the power section being connected to the cartridge, the electrical elements including the control circuit, the power supply, and the sensor.

16. The method of claim 1, wherein the first defining defines the first reservoir and the second reservoir using a first fabrication material that is one of transparent or translucent, the first fabrication material being configured to allow at least a portion of an interior of the first reservoir and the second reservoir to be viewable from outside of the cartridge.

17. The method of claim 1, wherein the first defining defines the first reservoir to be at least partially within the second reservoir.

18. The method of claim 17, wherein the first defining defines the first reservoir and the second reservoir using a first fabrication material that is one of transparent or translucent, the first fabrication material being configured to allow at least a portion of an interior of the first reservoir and the second reservoir to be viewable from outside of the cartridge.

19. The method of claim 17, wherein the inserting inserts the at least one first layer of the absorbent material in an annulus space, the annulus space at least partially surrounding the central channel, the first reservoir including the annulus space.

20. The method of claim 17, further comprising:

first connecting a first end of a first tube to a connector, the first tube at least partially defining the central channel;

second connecting a second end of a second tube to the connector, the first reservoir being at least partially defined by the first tube and the second tube; and connecting a third end of a third tube to the connector, the second reservoir being at least partially defined by the second tube and the third tube, the housing including the third tube.

* * * * *